United States Patent
Herman et al.

(10) Patent No.: US 12,100,198 B2
(45) Date of Patent: Sep. 24, 2024

(54) PHYSICAL ENVIRONMENT INTERACTION WITH AN EQUIVARIANT POLICY

(71) Applicants: Robert Bosch GMBH, Stuttgart (DE); Koninklijke Philips N.V., Eindhoven (NL)

(72) Inventors: Michael Herman, Sindelfingen (DE); Max Welling, Bussum (NL); Herke Van Hoof, Diemen (NL); Elise Van Der Pol, Amsterdam (NL); Daniel Worrall, Eindhoven (NL); Frans Adriaan Oliehoek, Delft (NL)

(73) Assignee: Robert Bosch GMBH, Stuttgart (DE)

( * ) Notice: Subject to any disclaimer, the term of this patent is extended or adjusted under 35 U.S.C. 154(b) by 364 days.

(21) Appl. No.: 17/642,451

(22) PCT Filed: Sep. 8, 2020

(86) PCT No.: PCT/EP2020/075107
§ 371 (c)(1),
(2) Date: Mar. 11, 2022

(87) PCT Pub. No.: WO2021/048145
PCT Pub. Date: Mar. 18, 2021

(65) Prior Publication Data
US 2022/0309773 A1    Sep. 29, 2022

(30) Foreign Application Priority Data
Sep. 11, 2019   (EP) ..................................... 19196681

(51) Int. Cl.
*G06V 10/82*   (2022.01)
*G06F 18/21*   (2023.01)
(Continued)

(52) U.S. Cl.
CPC ............ *G06V 10/82* (2022.01); *G06F 18/217* (2023.01); *G06N 3/04* (2013.01); *G06N 3/063* (2013.01); *G06N 3/08* (2013.01)

(58) Field of Classification Search
CPC ........ G06V 10/82; G06F 18/217; G06N 3/04; G06N 3/063; G06N 3/08; G06N 3/045;
(Continued)

(56) References Cited

U.S. PATENT DOCUMENTS

| | | | |
|---|---|---|---|
| 2018/0203848 A1* | 7/2018 | Perez | ...................... G10L 25/30 |
| 2018/0211156 A1* | 7/2018 | Guan | ..................... G06N 3/044 |

FOREIGN PATENT DOCUMENTS

| | | |
|---|---|---|
| WO | 2018016608 A1 | 1/2018 |
| WO | 2018071392 A1 | 4/2018 |

OTHER PUBLICATIONS

International Search Report and Written Opinion for PCT Patent App. No. PCT/EP2020/075107 (Dec. 14, 2020).
(Continued)

*Primary Examiner* — Chuong A Ngo
(74) *Attorney, Agent, or Firm* — Whitestone Law, PLLC (57) ABSTRACT

Some embodiments are directed to a computer-implemented method of interacting with a physical environment according to a policy. The policy determines multiple action probabilities of respective actions based on an observable state of the physical environment. The policy includes a neural network parameterized by a set of parameters. The neural network determines the action probabilities by determining a final layer input from an observable state and applying a final layer of the neural network to the final layer input. The final layer is applied by applying a linear combination of a set of equivariant base weight matrices to the final layer input. The base weight matrices are equivariant in the sense that, for a set of multiple predefined transforma-
(Continued)

tions of the final layer input, each transformation causes a corresponding predefined action permutation of the base weight matrix output for the final layer input.

15 Claims, 5 Drawing Sheets

(51) Int. Cl.
*G06N 3/04* (2023.01)
*G06N 3/063* (2023.01)
*G06N 3/08* (2023.01)

(58) Field of Classification Search
CPC .......... G06N 7/01; G06N 3/047; G06N 3/088; G06N 3/006
See application file for complete search history.

(56) References Cited

OTHER PUBLICATIONS

Timo Bram et al: "Attentive Multi-Task Deep Reinforcement Learning", Cornell University Library, 201 Olin Library Cornell University Ithaca, NY 14853, Jul. 5, 2019, p. 1-16.
Hyungseok Song et al: "Solving Continual Combinatorial Selection via Deep Reinforcement Learning", Cornell University Library, 201 Olin Library Cornell University Ithaca, NY 14853, Sep. 9, 2019, p. 1-14.
Shuxiao Chen et al: "Invariance reduces Variance: Understanding Data Augmentation in Deep Learning and Beyond", Cornell University Library, 201 Olin Library Cornell University Ithaca, NY 14853, Jul. 25, 2019, p. 1-44.
Adam C Earle et al: "Hierarchical Subtask Discovery With Non-Negative Matrix Factorization", Cornell University Library, 201 Olin Library Cornell University Ithaca, NY 14853, Aug. 1, 2017, p. 1-8.

* cited by examiner

PHYSICAL ENVIRONMENT INTERACTION WITH AN EQUIVARIANT POLICY

CROSS REFERENCE TO RELATED APPLICATIONS

This application is a national phase filing under 35 C.F.R. § 371 of and claims priority to PCT Patent Application No. PCT/EP2020/075107, filed on Sep. 8, 2020, which claims the priority benefit under 35 U.S.C. § 119 of European Patent Application No. 19196681.1 filed on Sep. 11, 2019 the contents of each of which are hereby incorporated in their entireties by reference.

BACKGROUND

Some embodiments of the presently disclosed subject matter relate to a computer-controlled system for interacting with a physical environment according to a policy and to a corresponding computer-implemented method. Some other embodiments of the presently disclosed subject matter relate to a training system for configuring such a system and a corresponding computer-implemented method. Some other embodiments of the presently disclosed subject matter relate to a computer-readable medium including instructions to perform one of the above methods, parameters for such a policy, and/or base weight matrix data for such a policy.

It is well known to apply computer-implemented methods to interact with a physical environment. Typically, sensor data is obtained from one or more sensors such as cameras, temperature sensors, pressure sensors, etcetera; a computer-implemented method is applied to determine an action based on the sensor data; and an actuator is used to effect the determined action in the physical environment, e.g., moving a robot arm, activating a steering or brake system of an autonomous vehicle, or controlling the movement of an interventional medical (robotic) tool in the body of a patient, etcetera. The procedure by which the action is determined is often referred to as the policy of the computer-controlled interaction.

Computer-controlled systems include robotic systems, in which a robot can perform one or more tasks automatically, e.g., under control of an external device or an embedded controller. Further examples of systems that can be computer-controlled are vehicles and components thereof, domestic appliances, power tools, manufacturing machines, personal assistants, access control systems, drones, nanorobots, and heating control systems. Various computer-controlled systems can operate autonomously in an environment, e.g., autonomous robots, autonomous agents, or intelligent agents.

Examples in healthcare robotics, particularly in Image Guided Therapies, include controlling motion of an Imaging system (e.g. X-Ray, magnetic resonance, ultrasound system) around the patient considering patient anatomy, occlusions, and operating room equipment; robotically guiding diagnostic imaging devices in lumens or outside lumens, such as without any limitation bronchoscopes in bronchi of the lung, or intravascular ultrasound devices inside vessels; steering a deployable or non-deployable medical tool (e.g. flexible or non-flexible needle, catheter, guidewires, balloon, stents etc.) towards targets based on x-ray or ultrasound images or other images, etc, to treat and/or measure biophysical parameters. A common healthcare example of a autonomous computer control is the dynamic adjustment of multiple imaging and display parameters (e.g., integration time, contrast) and filters for x-ray or ultrasound based on the current image content.

Although it is possible in some cases to hand-craft a policy, interestingly, it is also possible to use machine-learnable models, e.g., neural networks, as policies. Such machine-learnable models are typically parameterized by a set of parameters that can be trained for a particular task. In "Proximal Policy Optimization Algorithms", by John Schulman et al. (incorporated herein by reference and available at https://arxiv.org/abs/1707.06347), a method is disclosed for training such a policy. This method is from the field of reinforcement learning, in which the set of parameters is optimized with respect to a given reward function. The method alternates between sampling data through interaction with the environment, and optimizing the parameters, in this case of a neural network, based on the sampled data.

SUMMARY

Accordingly, in accordance with some embodiments of the presently disclosed subject matter, a computer-implemented method of interacting with a physical environment according to a policy is proposed, as defined by claim 1. In accordance with some other embodiments of the presently disclosed subject matter, a computer-implemented method of configuring a system which interacts with a physical environment according to a policy is proposed, as defined by claim 8. In accordance with some other embodiments of the presently disclosed subject matter, a computer-controlled system for interacting with a physical environment and a training system for configuring such a system are proposed, as defined by claims 12 and 13, respectively. In accordance with some other embodiments of the presently disclosed subject matter, computer-readable media are provided as defined by claims 14 and 15.

As is known per se, in various embodiments a neural network, also known as an artificial neural network, is used as a policy for interacting with a physical environment. Such a neural network policy may be parametrized by a set of parameters. The set of parameters may be trained based on interaction data of real and/or simulated interactions. Having been trained to perform a particular task, the policy may be deployed in a system to actually interact with the physical environment according to that set of parameters. During such an interaction, an observable state of the environment, such as a camera image, may be input to the policy. Based on this, an action may be selected to be effected in the environment by an actuator, such as a robot arm. The set of actions is typically finite, e.g., the robot arm may be driven left, right, up, or down. As is common in reinforcement learning, the policy may be stochastic, in the sense that the policy output may include multiple action probabilities of performing respective actions, instead of directly returning a single action to perform.

As the inventors realized, in many cases physical, environments in which interactions take place, may exhibit various symmetries in terms of which actions are expected to be beneficial in which observed states. For example, in a control system of an autonomous vehicle tasked to keep the vehicle in lane by steering left or right based on a camera image, if the image is flipped horizontally, then the desirability of steering left or steering right may similarly be reversed. Various other kinds of symmetries in observed state are possible as well, e.g., involving rotations, vertical or diagonal flips, etcetera. Multiple sensor measurements of the observable state may be affected differently by a symmetry, e.g., if an autonomous vehicle uses a camera image and a left/right tilting sensor, then a horizontal mirror symmetry may correspond to a horizontal flipping of the camera image and a negation of the angle measured by the tilting sensor. Possible actions may similarly be affected by environmental symmetries in various ways, e.g., some actions may be swapped or otherwise permuted, while other actions may not be affected by a particular symmetry at all. Generally, a symmetry may be represented by a transformation, in many cases a linear transformation, on the set of observable states; and by a permutation of the set of possible actions. Such symmetries may be found in an healthcare environment too, by taking into account some symmetries in the body of a patient (e.g. sagittal, frontal and/or transversal planes and axes, motion of a bone about the central axis, symmetry between organs—e.g. rights and left lungs, etc.) or in the environment of a theatre of operation in a surgery room. This symmetry may be detected directly from measurements or may be found after a previous processing of the results of those measurements to retrieve some symmetries.

The inventors realized that, by incorporating such symmetries in the neural network that computes the policy, much more efficient policies may be obtained. For example, less parameters may be needed to get a policy of the same quality, e.g., with the same expected accumulated reward. Alternatively, fixing the number of parameters, introducing symmetries may allow a policy to be obtained with a higher expected accumulated reward. During training of the neural network, data efficiency may be improved, e.g., the amount of observations needed to reach a policy of a certain quality may be reduced. The latter is especially significant when applying policies to physical, e.g., non-simulated, environments. Indeed, the amount of data needed to learn a policy can be quite large. On the other hand, obtaining a lot of observation data in non-simulated settings is typically difficult, e.g., interaction time is limited and failure may come with real-world costs.

In the domain of image classification, the use of symmetries in neural networks is known per se. For example, in "Group Equivariant Convolutional Networks" by T. S. Cohen and M. Welling (available at https://arxiv.org/abs/1602.07576 and incorporated herein by reference), it is shown to perform image classification on rotated handwritten digits. By incorporating translations, reflections, and rotations, a neural network is obtained that effectively learns to recognize digits regardless of how they are rotated. However, due to one of the many important differences between the image classification and reinforcement learning, such known group equivariant convolutional networks are not suited for determining action probabilities. For example, the final layer of such a neural network outputs the same classification regardless of how the image is rotated. This is undesirable when determining action probabilities, since, as discussed above, the desirability of performing an action may change along with a transformation of the input. Moreover, whereas standard group equivariant convolutional networks typically rely on invariance of images under translation, this is often not a useful type of symmetry to consider when determining action probabilities, since these are usually not expected to change in response to a translation of the input in a predictable way.

Interestingly, however, the inventors came up with a better type of neural network in which combined state/action symmetries of the physical environment at hand can be effectively incorporated. As is common, the neural network may include multiple layers. The action probabilities may be determined in a final layer of the neural network from a final layer input, in turn determined from the observable state. Interestingly, in various embodiments, the final layer may be applied to the final layer input by applying a linear combination of a set of carefully defined base weight matrices. The coefficients of this linear combination may be included in the set of parameters of the neural network. The output of applying the linear combination may provide pre-non-linearity activations for some or all of the action probabilities, from which the action probabilities may be computed, e.g., using a softmax. Interestingly, these base weight matrices may be defined to incorporate the combined state/action symmetries by being defined to be equivariant: for a set of multiple predefined transformations of the final layer input, each transformation causes a corresponding predefined action permutation of a base weight matrix output for the final layer input.

For example, a transformation of the final layer input may be a linear transformation represented as a matrix $R_\theta$ and a permutation of the base weight matrix output may similarly be represented as a matrix $P_\theta$. In this case, the base weight matrices W may satisfy the equivariance relation $P_\theta W = W R_\theta$ for each environment symmetry $\theta$ to be incorporated. This in turn may imply that $P_\theta W z = W R_\theta z$ for any final layer input. E.g., transforming a final layer input z to obtain transformed final layer input $R_\theta z$ may in this case cause the corresponding base weight matrix output $W R_\theta z$ to be a permutation $P_\theta W z$ by action permutation $P_\theta$ of the original base weight matrix output Wz of untransformed final layer input z.

If each base weight matrix is defined to be equivariant, then also a linear combination of such base weight matrices may be equivariant, and thus respect the symmetries in the physical environment. Thus, the set of base weight matrices may be effectively constrained to provide base weight matrix outputs, and thereby the action probabilities determined from them, respecting the symmetries of the physical environment. Because symmetries are taken into account, effectively, experience from one observed state may be re-used to derive actions in other transformed states. Notably, not only the vision parts of the network, as in existing convolutional neural networks, but also the exploration may be re-used, which can be particularly important in reinforcement learning due to the sparsity of rewards. Accordingly, by respecting symmetries in the physical environment, less parameters may be needed to obtain a neural network with a certain expressivity, providing efficiency improvements both in use and in training.

Interestingly, the techniques described herein may be applied without a need to learn symmetries, e.g., from environmental models or shaped reward symmetries: instead, symmetries can be specified a priori and used as disclosed herein, without needing to specify whole policies, environmental models, or reward shaping. For example, inferring a model as in various known model-based approaches is not needed, avoiding the need for the associated complex architectures with many moving parts.

In more detail, with regards to the action permutations of the base weight matrix outputs, these typically correspond to symmetries of the physical environment. For example, it may be expected that a certain transformation of the observable state of the physical environment, e.g., a horizontal swap of an image of the environment, causes a certain permutation of actions to be performed, e.g., performing a first action in the physical environment represented by the image corresponds to performing a second action in the physical environment represented by the swapped image. The action permutations may be predefined, e.g., manually defined. The action permutations may be obtained as an input to training the neural network, e.g., for use in generating the base weight matrices, but may also be implicit as restrictions on base weight matrices obtained from an external source.

With regards to the transformations of the final layer input: these may reflect the symmetries of the physical environment in various ways. Possibly, the final layer input is determined from the observable state in an equivariant way, e.g., given multiple state transformations of the observable state, each state transformation causes a corresponding transformation to the final layer input. These transformations to the final layer input may then correspond to the action permutations as discussed above. The transformations are typically predefined, e.g., manually defined as part of the neural network design. The transformations may be explicitly given as input to training of the neural network, e.g., for generating the set of base weight matrices, or may be implicit as restrictions on base weight matrices obtained from an external source.

For example, the physical environment may be expected to satisfy a symmetry, e.g. a mirror symmetry $\theta$, wherein observable states are equivariant to action probabilities: each transformation $Q_\theta x$ of observable state x is expected to correspond to a permutation $P_\theta y$ of action probabilities y. The final layer input may then be defined to be equivariant to the observable state and to the action probabilities: transformation $R_\theta$ of final layer input z may be defined in such a way that, for an observable state x, transformation $R_\theta z$ of the corresponding final layer input is equal to the final layer input for transformed observable state $Q_\theta x$. Moreover, as discussed above, for base weight matrix W, transformation $R_\theta$ may correspond to permutation $P_\theta$ as prescribed above, e.g., $P_\theta W = W R_\theta$.

Interestingly, by having corresponding observable state transformations, final layer input transformations, and action permutations, the overall neural network may satisfy equivariance as well, e.g., may provide action probabilities respecting the environment symmetries corresponding to these transformations and permutations. This can be the case regardless of how exactly previous layers guarantee the equivariance, for which several possibilities are presented. By preserving the symmetries throughout the network, particularly efficient learning and accurate results may be obtained.

For example, the final layer input may be determined from the observable state by applying one or more layers of a known group-equivariant neural network, e.g., as disclosed in "Group Equivariant Convolutional Networks". For example, a known neural network designed for image classification invariant to translations and swaps may be used. A transformation, e.g., a translation or a swap, of an input to such a network may cause a corresponding transformation of a layer output. Such a layer output may be used as a final layer input for a policy as described herein, where transformations of the internal layer output corresponding to environment symmetries are used to define the base weight matrices of the final layer. These environment symmetries typically do not include a translation.

However, it is not needed to use the group-equivariant neural networks as disclosed in "Group Equivariant Convolutional Networks", and in particular, it is also not necessary to use internal layers that preserve translations as described in "Group Equivariant Convolutional Networks". Throughout, examples are provided. It is not even necessary to use a neural network for determining the final layer input that explicitly takes environmental symmetries into account, e.g., the neural network may be trained using observable states and their transformations as input, wherein the neural network may be encouraged via its loss function to determine final layer inputs that transform in an equivariant way when applied to transformed observable states. In fact, just using a final layer as described herein may already sufficiently encourage the neural network to provide final layer inputs that transform according to observable state transformations.

Regardless of the exact transformations of the final layer inputs and the corresponding action permutations, the base weight matrices may be defined in various ways. For example, a base weight matrix may be represented as a matrix, as a set of vectors to be applied as inner products to final layer inputs, etcetera. Multiple base weight matrices may be derived from a single submatrix, e.g., for one input and/or output channel. As discussed below, the base weight matrices may be predefined, e.g., precomputed by computer or by hand, or computed when needed. In any case, typically, at least some of the base weight matrices affect multiple outputs of the final layer, thus reflecting the fact that the environmental symmetries restrict the possible outputs of the neural network. The affecting of multiple outputs by a base weight matrix can thus be regarded as a kind of weight sharing between the different outputs by which a reduction in the number of parameters of the neural network may be achieved.

Although the base weight matrices can span the full space of weight matrices which respect the transformations and action permutations, interestingly, this is not necessary: the set of base weight matrices may span just a subspace of allowed base weight matrices, e.g., a randomly sampled subspace. This may allow for an even greater reduction in the number of parameters, in particular where the number of base weight matrices would otherwise become prohibitively large. Accordingly, it is possible to preserve equivariance and get a trade-off between performance and expressivity of the neural network layer.

The linear combinations of base weight matrices discussed above may be applied both when interacting with physical environments according to a policy, and when configuring, e.g., training, systems for performing such environment interaction. In both cases, fewer parameters may be needed for the final layer of the neural network, thereby improving efficiency both of training and of using the neural network.

Optionally, the environment symmetries that define the transformations and permutations may form a mathematical group, e.g., the set of environment symmetries may include an identity symmetry, may be closed under composition of transformations, may be associative, and may be closed under inverses. These properties are natural properties for symmetries, e.g., if a policy should respect a single rotation by 90 degrees of an image, then it should also respect repeated rotation by 90 degrees and rotation by −90 degrees. By considering a full group of symmetries, the available symmetries may be used more optimally by the model.

Optionally, the sensor data may include an image of the physical environment. In various applications, images provide useful information about environment states, e.g., a traffic situation for an autonomous vehicle, a medical environment of a medical tool, an intermediate product for a manufacturing robot, etcetera. Images often exhibit various symmetries, e.g., rotation or mirroring, that correspond to action permutations of actions to be performed with actuators. In such cases, the use of techniques as provided herein to incorporate such state/action state symmetries may be particularly effective.

Optionally, a feature transformation corresponds to a rotation of the image of the physical environment and/or a feature transformation corresponds to a reflection of the image. For example, the reflection may be a mirroring, e.g. in a central axis of an image or 3D scene. In an embodiment, a feature transformation corresponds to a 180-degree rotation of the image. In an embodiment, the set of feature transformations includes a 90-degree rotation, a 180-degree rotation, and a 270-degree rotation. In an embodiment, the set of transformations includes a horizontal mirroring and a vertical mirroring. Such environment symmetries often occur in practice and hence are particularly useful to incorporate in a neural network for a policy.

Optionally, the sensor data may include one or more additional sensor measurement values in addition to images. The symmetries of the physical environment may affect such measurement values in different ways. For example, one or more additional sensor measurements values may be invariant under an environment symmetry that does affect the image, e.g., the image may be swapped whereas a temperature measurement may not be affected. Interestingly, however, also one or more additional sensor measurements may transform along with the input image, e.g., as an input image swaps horizontally, a measurement of an angle with the horizontal plane may be inverted. Interestingly, also such transformations of additional sensor measurements may be taken into account by the neural network, allowing such sensor measurements to be effectively used to determine the action probabilities.

Optionally, applying the final layer may includes applying a further linear combination of the set of base weight matrices to the final layer input, apart from the original linear combination discussed above. The coefficients of the further linear combination may be included in the set of parameters in addition to the coefficients of the original linear combination. For example, the set of possible actions to be carried out may include multiple subsets that are each separately affected by the action permutations. For example, actions $a_1$ and $a_2$ may be swapped by an action permutation and actions $a_3$ and $a_4$ may be swapped independently. In such cases, instead of obtaining a set of base weight matrices for computing $a_1$ to $a_4$ at the same time, a set of base weight matrices may be obtained which is then applied first to compute outputs for a first subset of actions $a_1$ and $a_2$ and then, with a different set of parameters, also to comptue outputs for the second subset of actions $a_3$ and $a_4$. Thereby, the set of base weight matrices can be re-used, reducing the storage needed to keep them and, when applicable, also the computational resources needed to compute them.

Optionally, applying the final layer further may include applying a further linear combination of a further set of base weight matrices to the final layer input. The further set of base weight matrices may be obtained similarly to the original set of base weight matrices. Interestingly, however, the further set of base weight matrices may be equivariant to another set of transformations: for this further set of multiple predefined transformations of the final layer input, each transformation causes a corresponding further predefined action permutation of a further base weight matrix output for the final layer input. Accordingly, the set of possible actions may include a first subset, action probabilities of which are determined using the original set of base weight matrices; and a second subset, action probabilities of which are determined using the further set of base weight matrices. Although a single overall set of base weight matrices could also be used to determine action probabilities for both sets of possible actions, interestingly, using different base weight matrices may be more efficient because a smaller number of base weight matrices may suffice, and the base weight matrices may themselves be smaller. Possibly, the final layer input is equivariant both to the original set of transformations and to the further set of transformations, as discussed above.

Optionally, determining the action probability may further include applying a softmax at least to outputs of applying the linear combination of the base weight matrices to the final layer input. The linear combination of base weight matrices may provide values indicative of relative desirability of performing respective actions. By applying a softmax to such relative desirability values, a probability distribution over the actions may be obtained. For example, the softmax may be applied to the outputs of the linear combination of the base weight matrices and optionally also other linear combinations providing desirability values of other possible actions.

Optionally, the final layer input may include multiple feature vectors corresponding to respective transformations of the observable state. For example, transforming the observable state according to a state-action symmetry may result in a permutation of the multiple feature vectors. In other words, the transformation of the final layer input may include a permutation of the multiple feature vectors and can thus be evaluated relatively efficiently. For example, known group convolutional neural networks typically provide feature vectors of this type. The feature vectors may include one, at most or at least two, or at most or at least five features, for example. Similarly, some or all other layers of the neural network may include multiple feature vectors corresponding to the respective transformations of the observable state.

Optionally, a feature of the final layer input, or an input to an earlier layer, may be determined by average pooling over feature vectors corresponding to translations of the observable state. For example, prior layers of the neural network may provide feature vectors each corresponding to performing both a translation and another transformation of the observable state, as disclosed, for example, in "Group Equivariant Convolutional Networks". The feature vectors corresponding to various translations and a particular other transformation may be average pooled to obtain a feature vector for the other transformation, thus allowing the object recognition capabilities of translation-equivariant neural networks to be used in earlier layers while providing a more compressed input to for later layers.

Optionally, the multiple action probabilities include at least one action probability invariant under each of the action permutations, and at least one action probability not invariant under some of the action permutations. For example, two actions, e.g., "move left" and "move right", may be swapped under the action permutation, e.g., corresponding to mirroring an input image, whereas another action, e.g., "do nothing", may not be affected by this transformation of the input. Interestingly, the techniques provided herein are powerful enough to express such kinds of action permutations, and, more generally, other kinds of action permutations that do not have a one-to-one correspondence with the symmetries of the physical environment.

Optionally, further base weight matrices may be obtained for a further layer of the neural network. Specifically, a set of further base weight matrices for the further layer of the neural network may be obtained wherein transforming a further layer input according to a transformation from the set of multiple predefined transformations causes a corresponding predefined transformation of a further base weight matrix output for the further layer input. To evaluate this further layer, a linear combination of the set of further base weight matrices may be applied to the further layer input. For example, the transformations of the further layer input and further layer output may correspond to the symmetries of the physical environment similarly to the final layer input, as discussed above. By using linear combinations of base weight matrices at other layers of the neural network, and possibly, at all or most layers of the neural network, a better reduction of the set of parameters of the neural network may be achieved.

Optionally, when training the policy, in other words optimizing its set of parameters, the set of base weight matrices for the final layer may be determined automatically from the multiple predefined transformations and corresponding predefined action permutations. Further sets of base weight matrices for further layers may be determined automatically as well. Although in some cases, it may be possible to determine a set of base weight matrices by hand, especially for larger layer sizes and/or larger number of symmetries such a manual computation may become infeasible, and can be cumbersome to be performed many times. For larger layer sizes, an approximate set of base weight matrices may be determined, e.g., a set of base weight matrices that provide equivariance but do not necessarily span the whole set of possible equivariances, thus providing a further reduction in the number of parameters without affecting equivariance.

Determining the set of base weight matrices for the final layer may be phrased, in various embodiments, as determining a set of weight matrices W satisfying the equation $P_\theta W = W R_\theta$ for each transformation $R_\theta$ of the final layer input and each permutation $P_\theta$ of the base weight matrix output, and similarly for the other layers. Equations $P_\theta W = W R_\theta$ may give rise to a linear system in the entries of W that can be solved using generic techniques. Similar equations can be defined for the other layers.

Optionally, a base weight matrix is obtained by obtaining an initial weight matrix W, applying transformations and inverses of a corresponding action permutations to the initial weight matrix, and adding together the transformed and permuted initial weight matrices. Especially for linear transformations $P_\theta$, $R_\theta$, the inventors realized that computing $W' = \Sigma_\theta P_\theta^{-1} W R_\theta$ may provide a weight matrix that satisfies equivariance relation $P_\theta W = W R_\theta$ with respect to each of the $P_\theta$, $R_\theta$. Accordingly, candidate base weight matrices may be obtained. Optionally, a set of candidate base weight matrices obtained in this way may be further refined by orthogonalizing the base weight matrices, e.g., vectorizing the base weight matrices, orthonormalizing the vectorized base weight matrices, and un-vectorizing the orthonormalized vectorized base weight matrices. Thus, in a randomized way, a set of base weight matrices may be obtained that provide a good representation of the overall set of base weight matrices.

Optionally, the set of parameters may be optimized using a policy gradient algorithm. Various policy gradient techniques, such as the PPO method disclosed in "Proximal Policy Optimization Algorithms" by John Schulman et al., may be combined with the neural networks provided herein. Because of the incorporation of state/action symmetries in the neural networks and the resulting reduction in the number of parameters, the techniques provided herein allow a significant improvement in data efficiency for policy gradient algorithms. It is noted that, although PPO is a so-called model-free reinforcement learning technique, the techniques described herein are also applicable to model-based reinforcement learning.

It will be appreciated by those skilled in the art that two or more of the above-mentioned embodiments, implementations, and/or optional aspects of some embodiments of the presently disclosed subject matter may be combined in any way deemed useful.

Modifications and variations of any system and/or any computer readable medium, which correspond to the described modifications and variations of a corresponding computer-implemented method, can be carried out by a person skilled in the art on the basis of the present description.

BRIEF DESCRIPTION OF THE DRAWINGS

These and other aspects of some embodiments of the presently disclosed subject matter will be apparent from and elucidated further with reference to the embodiments described by way of example in the following description and with reference to the accompanying drawings, in which.

It should be noted that the figures are purely diagrammatic and not drawn to scale. In the figures, elements which correspond to elements already described may have the same reference numerals.

DETAILED DESCRIPTION OF EMBODIMENTS

Figure 1:
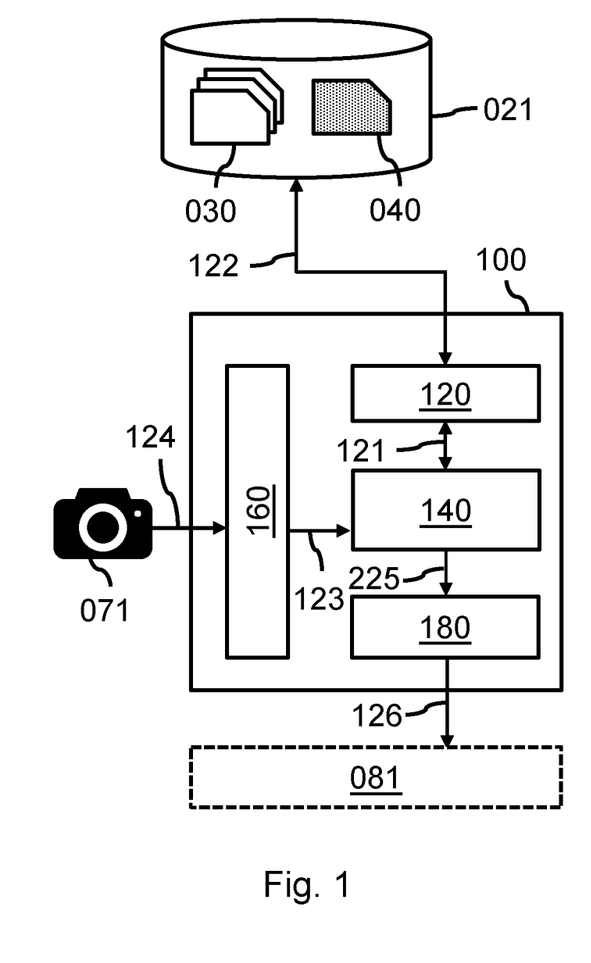
FIG. 1 shows a computer-controlled system for interacting with a physical environment according to a policy.

FIG. 1 shows a computer-controlled system 100 for interacting with a physical environment 081 according to a policy. The policy may determine multiple action probabilities of respective actions based on an observable state of physical environment 081. The policy may include a neural network parameterized by a set of parameters 040. The neural network may determine the action probabilities by determining a final layer input from an observable state and applying a final layer of the neural network to the final layer input. The system 100 may include a data interface 120 and a processor subsystem 140 which may internally communicate via data communication 121. Data interface 120 may be for accessing the set of parameters of the policy 040. Data interface 120 may also be for accessing base weight matrix data 030 as discussed below. Set of parameters 042 and/or base weight matrix data 030 may be determined according to a method described herein, e.g., by system 200 of FIG. 2.

The processor subsystem 140 may be configured to, during operation of the system 100 and using the data interface 120, access data 030, 040. For example, as shown in FIG. 1, the data interface 120 may provide access 122 to an external data storage 021 which may include the data 030, 040. Alternatively, the data 030, 040 may be accessed from an internal data storage which is part of the system 100. Alternatively, the data 030, 040 may be received via a network from another entity. For example, while system 100 is being configured, data 030, 040 may be obtained from system 200 of FIG. 2, for example, multiple times for respective environment interactions. In general, the data interface 120 may take various forms, such as a network interface to a local or wide area network, e.g., the Internet, a storage interface to an internal or external data storage, etc. The data storage 021 may take any known and suitable form.

The system 100 may include an image input interface 160 or any other type of input interface for obtaining sensor data 124 from one or more sensors, such as a camera 071, indicative of the observable state of the physical environment. For example, the camera may be configured to capture image data 124, processor subsystem 140 being configured to determine the observable state based on the image data 124 obtained, via data communication 123, from input interface 160. The input interface may be configured for various types of sensor signals indicating physical quantities of the environment and/or the device 100 itself, and combinations thereof, e.g., video signals, radar/LiDAR signals, ultrasonic signals, etc.

In some embodiments, the sensor(s) may be arranged in environment 081. In other examples, the sensor may be arranged remotely from the environment 081, for example if the quantity(s) can be measured remotely. For example, a camera-based sensor may be arranged outside of environment 081 but may nevertheless measure quantities associated with the environment, such as a position and/or orientation of the physical entity in the environment. Sensor interface 180 may also access the sensor data from elsewhere, e.g., from a data storage or a network location. Sensor interface 180 may have any suitable form, including but not limited to a low-level communication interface, e.g., based on I2C or SPI data communication, but also a data storage interface such as a memory interface or a persistent storage interface, or a personal, local or wide area network interface such as a Bluetooth, Zigbee or Wi-Fi interface or an ethernet or fiberoptic interface. The sensor may be part of system 100.

The system 100 may include an actuator interface 180 for providing, to an actuator, actuator data causing the actuator to effect an action in the physical environment 081 of system 100. For example, processor subsystem 140 may be configured to determine the actuator data based at least in part on action probabilities determined by a policy as described herein. For instance, the policy may detect an exceptional situation, e.g., a risk of collision, and based on this, a safety system, e.g., a brake, may be activated. There can also be multiple actuators performing respective actions. The actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, solenoids, stepper motors, servomechanisms, etc. The actuator may be part of system 200.

Processor subsystem 140 may be configured to, during operation of the system 100 and using the data interface 120, obtain base weight matrix data 030 representing a set of base weight matrices for the final layer of the neural network wherein, for a set of multiple predefined transformations of the final layer input, each transformation causes a corresponding predefined action permutation of a base weight matrix output for the final layer input. Processor subsystem 140 may be further configured to control the interaction with the physical environment by repeatedly obtaining sensor data from one or more sensors indicative of the observable state of the physical environment via sensor interface 160; determining action probabilities; and providing, via actuator interface 180, actuator data 126 to an actuator causing the actuator to effect an action in the physical environment based on the determined action probabilities. Processor subsystem 140 may be configured to determine the action probabilities based on the observable state, including applying the final layer of the neural network by applying a linear combination of the set of base weight matrices to the final layer input, coefficients of the linear combination being included in the set of parameters.

Figure 3:
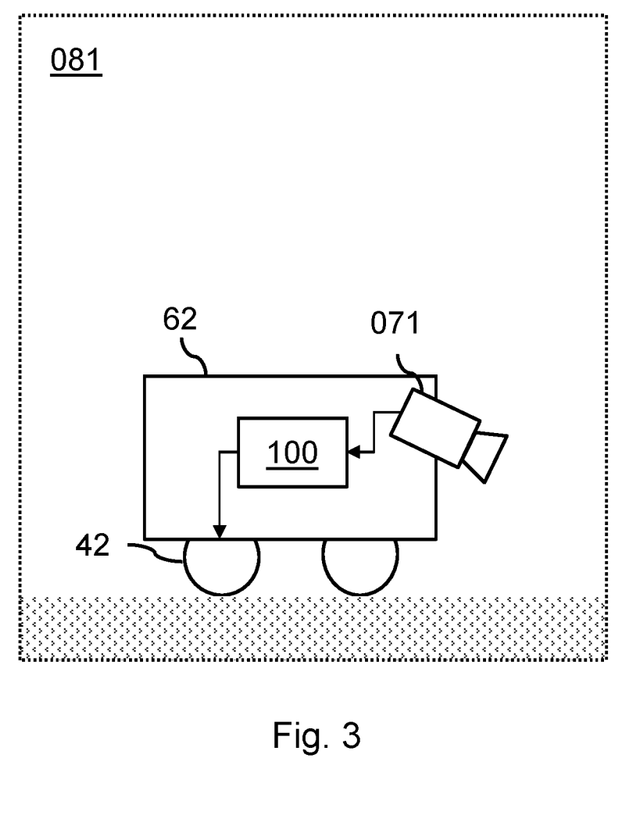
FIG. 3 shows a computer-controlled system for interacting with a physical environment, in this case, an autonomous vehicle.
Figure 4:
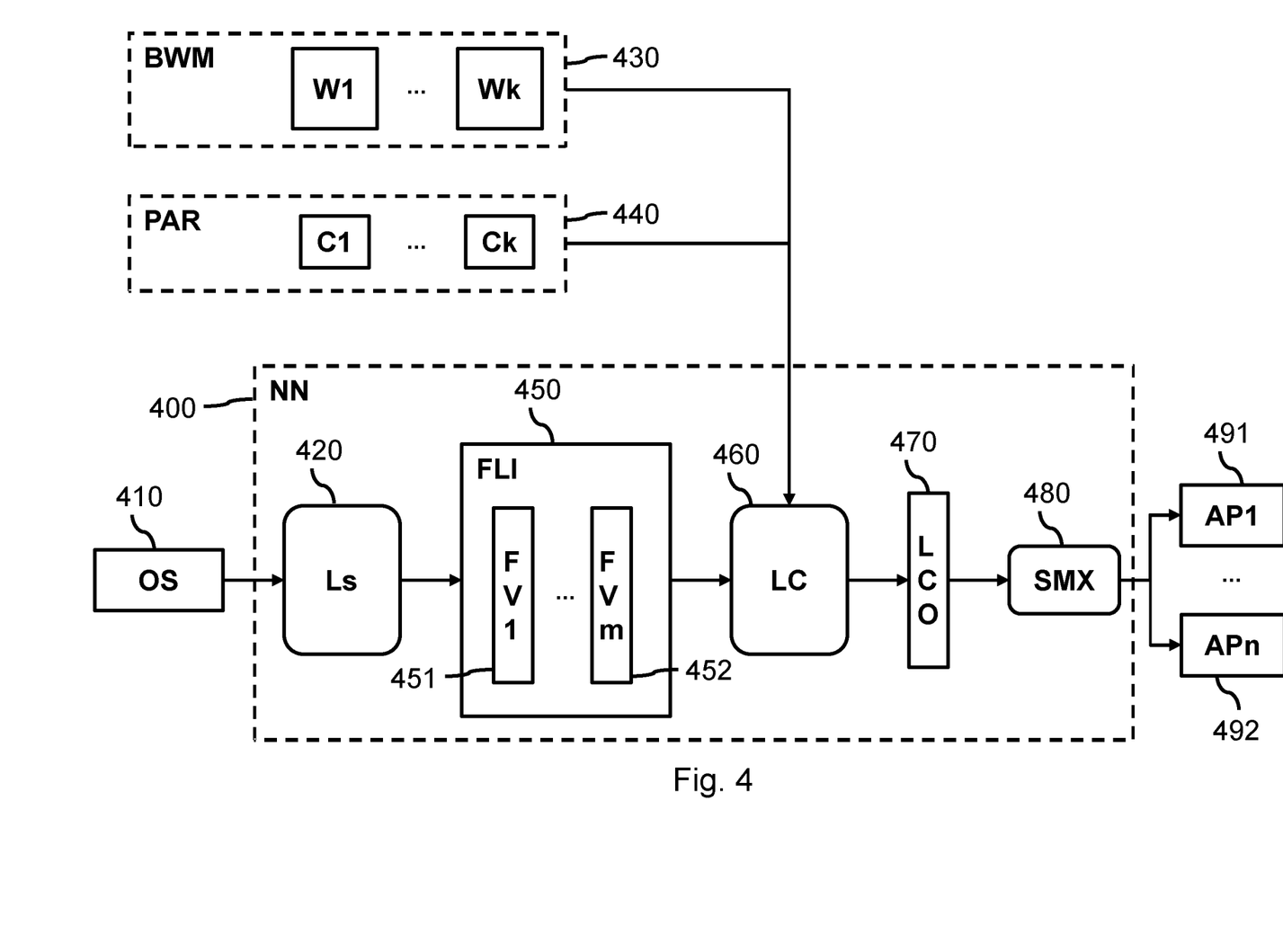
FIG. 4 shows a detailed example of a neural network of a policy for interacting with a physical environment.

Various details and aspects of the operation of the system 100 will be further elucidated with reference to FIGS. 3-4, including optional aspects thereof.

In general, the system 100 may be embodied as, or in, a single device or apparatus, such as a workstation, e.g., laptop or desktop-based, or a server. The device or apparatus may include one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA) and/or a Graphics Processing Unit (GPU). In general, each functional unit of the system may be implemented in the form of a circuit. It is noted that the system 100 may also be implemented in a distributed manner, e.g., involving different devices or apparatuses, such as distributed servers, e.g., in the form of cloud computing.

Figure 2:
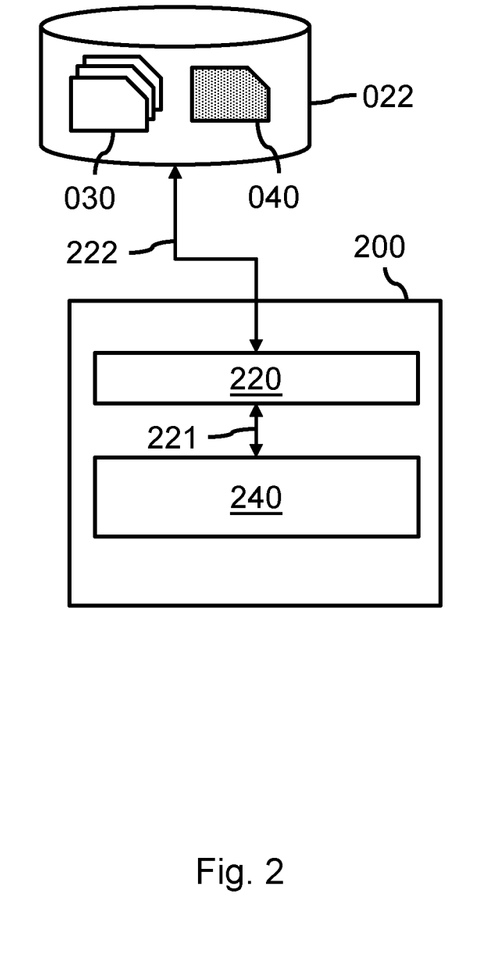
FIG. 2 shows a training system for configuring a computer-controlled system which interacts with a physical environment according to a policy.

FIG. 2 shows a training system 200 for configuring a computer-controlled system which interacts with a physical environment according to a policy as described herein. For example, training system 200 may be for configuring system 100. Training system 200 and system 100 may be combined into a single system.

The training system 200 may include a data interface 220 and a processor subsystem 240 which may internally communicate via data communication 221. Data interface 220 may be for accessing the set of parameters of the policy 040. Data interface 220 may also be for accessing base weight matrix data 030 representing a set of base weight matrices for the final layer of the neural network wherein, for a set of multiple predefined transformations of the final layer input, each transformation causes a corresponding predefined action permutation of a base weight matrix output for the final layer input.

The processor subsystem 240 may be configured to, during operation of the system 200 and using the data interface 220, access data 030, 040. For example, as shown in FIG. 2, the data interface 220 may provide access 222 to an external data storage 022 which may include the data 030, 040. Alternatively, the data 030, 040 may be accessed from an internal data storage which is part of the system 200.

Alternatively, the data 030, 040 may be received via a network from another entity. In general, the data interface 220 may take various forms, such as a network interface to a local or wide area network, e.g., the Internet, a storage interface to an internal or external data storage, etc. The data storage 022 may take any known and suitable form.

Processor subsystem 140 may be configured to, during operation of the system 100 and using the data interface 120, optimize a set of parameters 040 of the policy to maximize an expected reward of interacting with the environment accordingly. To optimize the set of parameters, processor subsystem 140 may be configured to repeatedly obtain interaction data indicative of a sequence of observed environment states and corresponding actions performed by the computer-controlled system to be configured; determine a reward of the interaction; determining an action probability, in an observed state of the sequence of observed environment states, of the policy selecting the corresponding action; and adjust the set of parameters 040 to increase the expected reward based on the determined reward and action probability. To apply the final layer of the neural network, processor subsystem 140 may apply a linear combination of the set of base weight matrices 030 to the final layer input, coefficients of the linear combination being included in the set of parameters 040.

The system 200 may also include a communication interface (not shown) configured for communication with the system to be configured, e.g., system 100. For example, system 200 may obtain interaction data of one or more environment interactions of the other system via the communication interface. The interaction data may be obtained before optimizing the set of parameters, and/or while optimizing the set of parameters. In the latter case, system 200 may also provide the current set of parameters 040 of the policy to the other system in order to let the other system interact with the environment according to the current policy. Various known types of communication interfaces may be used, e.g., arranged for direct communication with the other system 200, e.g., using USB, IEEE 1394, or similar interfaces; or over a computer network, for example, a wireless personal area network, an internet, an intranet, a LAN, a WLAN, etc. The communication interface may also be an internal communication interface, e.g., a bus, an API, a storage interface, etc.

Various details and aspects of the operation of the system 200 will be further elucidated with reference to FIGS. 3-4, including optional aspects thereof.

In general, the system 200 may be embodied as, or in, a single device or apparatus, such as a workstation, e.g., laptop or desktop-based, or a server. The device or apparatus may include one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA) and/or a Graphics Processing Unit (GPU). In general, each functional unit of the system may be implemented in the form of a circuit. It is noted that the system 200 may also be implemented in a distributed manner, e.g., involving different devices or apparatuses, such as distributed servers, e.g., in the form of cloud computing.

FIG. 3 shows an example of the above, in that an automotive control system 300 for controlling a vehicle 62 is shown that includes a system for interacting with a physical environment according to a policy according to an embodiment, e.g., system 100 of FIG. 1 (not shown separately). Vehicle 62 may be an autonomous or semi-autonomous vehicle, but this is not necessary, e.g., system 300 can also be a driver-assistance system of a non-autonomous vehicle 62. For example, vehicle 62 may incorporate the interaction system to control the vehicle based on images obtained from camera 071. For example, automotive control system 300 may include a camera interface (not shown separately) for obtaining an image of an environment 081 of the vehicle from the camera 071.

Control system 300 may further include an actuator interface (not shown separately) for providing, to an actuator, actuator data causing the actuator to effect an action to control vehicle 62 in physical environment 081. Automotive control system 300 may be configured to determine the actuator data to control vehicle 62 based on the action probabilities determined by the policy; and to provide the actuator data to the actuator via the actuator interface. For example, the actuator may be caused to control steering and/or braking of the vehicle. For example, the control system may control or assist steering of vehicle 62, by rotating wheels 42. For example, wheels 42 may be rotated left or right in order to keep vehicle 62 in lane. The policy may be configured to be equivariant under horizontal swaps in this case, e.g., if camera image 071 is swapped horizontally, then actions to rotate the wheels leftward or rightward may be permuted.

FIG. 4 shows a detailed yet non-limiting example of a neural network NN, 400 of a policy for interacting with a physical environment. For example, neural network NN may be applied in system 100 of FIG. 1 and/or in system 200 of FIG. 2.

As shown in the figure, neural network NN may be configured to determine multiple action probabilities AP1, 491, up to APn, 492, of respective actions. Various numbers of action probabilities are possible, e.g., two, three, at most or at least five, or at most or at least ten. Each action may correspond to signals to be provided to one or more actuators to perform a particular action, e.g., "move left", "move right", "move up", "move down", etcetera. One of the actions may be a no-op, e.g., an action that does not affect the physical environment. Neural network NN may be configured to determine the action probabilities in such a way that they sum up to one, e.g., by using a softmax function.

Neural network NN may determine the action probabilities APi based on an observable state OS, 410, of the physical environment. The observable state typically includes one or more sensor measurements, e.g., an image of the physical environment obtained from a camera and/or one or more additional sensor measurement values. Observable state OS may be represented by a feature vector, e.g., of at most or at least 100, or at most or at least 1000 features. Observable state OS may include or be based on multiple previous sensor measurements, e.g., observable state OS may include a rolling history of a fixed number of most recent sensor measurement, a rolling average of recent sensor measurements, etc. Depending on the application also various types of processing, e.g., image processing such as scaling, may be performed to obtain observable state OS from the sensor measurements. Generally, observable state OS may include various kinds of sensor data, audio data, video data, radar data, LiDAR data, ultrasonic data, or various individual sensor readings or their histories.

Neural network NN may be parametrized by a set of parameters PAR, 440. For example, the set of parameters PAR may include coefficients of base weight matrices for the final layer or for other layers as described herein. For example, the number of layers of neural network NN may be at least 5 or at least 10, and the number of parameters PAR may be at least 1000 or at least 10000. It is beneficial from the point of view of efficiency of training to use a neural network NN which is amenable to gradient-based optimization, e.g., which is continuous and/or differentiable in its set of parameters. Neural networks are also known as artificial neural networks.

In various embodiments, parameters PAR of the neural network NN may be optimized to maximize an expected reward of interacting with the environment according to the corresponding policy. For example, the expected reward may be an expected cumulative reward defined by modelling environment interactions as a Markov Decision Process (MDP). Mathematically speaking, a MDP is a tuple ($\mathcal{S}$, $\mathcal{A}$, R, T, γ), where $\mathcal{S}$ is the space of possible environment states OS, $\mathcal{A}$ is the space of possible actions, R: $\mathcal{S} \times \mathcal{A} \to \mathbb{R}$ is an immediate reward function, T: $\mathcal{S} \times \mathcal{A} \times \mathcal{S} \to [0,1]$ is a transition function and γ∈[0,1] is a discount factor. The policy evaluated by neural network NN may be defined as $\pi_\omega$: $\mathcal{S} \to \Delta(\mathcal{A})$ where $\Delta(\mathcal{A})$ is the probability simplex on the action space, e.g., the set of action probabilities AP1, . . . , APn summing up to one. Here, ω denote the set of parameters PAR of the policy.

In various embodiments, neural network NN may be trained to incorporate state/action symmetries of the physical environment in which the interaction takes place. The set of symmetries may be denoted Θ. The set Θ is typically assumed to have a mathematical group structure, e.g., Θ may incldue an identity symmetry, may be closed under composition ○ of symmetries and taking inverses, and may be associative, meaning that symmetries $\theta_1 \circ (\theta_2 \circ \theta_3)$ and $(\theta_1 \circ \theta_2) \circ \theta_3$ are equal. For example, the group of symmetries may be the set of horizontal mirrorings {I, H}, with I denoting the identity and H denoting a horizontal mirroring; or the set of horizontal and/or vertical mirrorings {I, H, V, H○V}, with I denoting the identity, H denoting a horizontal mirroring, V denoting a vertical mirroring, and H○V denoting a horizontal and vertical mirroring, etcetera.

A symmetry typically affects both the observable state OS and the set of possible actions for which action probabilities AP1, . . . , APn are determined. For example, for each symmetry θ, a transformation $Q_\theta$ of the observable state may be defined. For example, transformation $Q_\theta$ may rotate or reflect an input image included on the observable state. Typically, $Q_\theta$ is a linear transformation, e.g., represented by a matrix. Moreover, for each symmetry θ, a permutation $P_\theta$ of action probabilities APi may be defined, e.g., also represented by a matrix. The techniques provided herein are powerful enough to support various types of permutations, e.g., in some embodiments, the action probabilities include at least one action probability invariant under each action permutation, and at least one action probability not invariant under some of the action permutations. Interestingly, in various embodiments, neural network NN may be configured to be equivariant with respect to these observable state transformations and action permutations, e.g., it may be enforced or at least stimulated that transforming the state OS and then computing the action probabilities APi results in the same output as computing the action probabilities APi and then permuting them, e.g., $$P_\theta[\pi_\omega](\cdot|s) = \pi_\omega(\cdot|Q_\theta[s]).$$

where $Q_\theta$ is a transformation of the observable state s and $P_\theta$ is the corresponding action permutation. The symmetries, and the corresponding transformations of observable states, action probabilities, and intermediate layer feature vectors, are typically manually defined.

As shown in the figure, neural network NN may determine the action probabilities APi by, in an operation Ls, 420, determining a final layer input FLI, 450, from observable state OS; and then applying a final layer of the neural network to final layer input FLI. Possibly, operation Ls is configured to be equivariant to symmetries Θ, in the sense that each transformation $Q_\theta$, θ∈Θ of the observable state OS causes a corresponding transformation $R_\theta$ of final layer input FLi. As noted, however, it is not strictly needed to enforce this, e.g., the equivariance may be approximate. Various ways of determining final layer input FLI are discussed in more detail below.

Interestingly, the final layer of neural network NN may be configured to preserve equivariance through the use of a set of base weight matrices BWM, 430 that are equivariant with respect to the desired set of symmetries of the physical environment. For example, each transformation $R_\theta z$ of the final layer input z corresponding to such a symmetry may causes a corresponding action permutation $P_\theta$ of base weight matrix output Wz of applying the base weight matrix to final layer input z, e.g., $P_\theta W Z z = W R_\theta z$ for final layer input FLI, z, and symmetry θ∈Θ. Set of parameters PAR may include a coefficient corresponding to each base weight matrix, and the final layer of neural network NN may be applied by applying a linear combination LC, 460, of the set of base weight matrices BWM to the final layer input FLI with coefficients given by the set of parameters PAR. Interestingly, if the base weight matrices are equivariant then so is a linear combination, and accordingly, an equivariant linear combination output LCO, 470, may be obtained. A softmax SMX, 480, may then be applied to at least the linear combination outputs LCO to obtain action probabilities APi.

As an example, shown in the figure are base weight matrices W1, . . . , Wk and corresponding linear combination coefficients C1, . . . , Ck. When applying the neural network NN, the base weight matrices and coefficients are typically fixed. When training the neural network, at least the coefficients are typically trained, e.g., the expected reward of interacting with the environment may be maximized with respect to the coefficients.

The set of base weight matrices BWM may be defined in various ways. For example, mathematically speaking, equivariance of a weight matrix W applied in the final layer of the neural network NN may be phrased as:

$$P_\theta W z = W R_\theta z, \forall z \in Z, \theta \in \Theta \Leftrightarrow P_\theta W = W R_\theta \Leftrightarrow W = P_\theta^{-1} W R_\theta.$$

Accordingly, equivariance of W may be phrased as $W = P_\theta^{-1} W R_\theta$, or $W \in \mathcal{W}$ where $\mathcal{W} = \{W | W = P_\theta^{-1} W R_\theta, \forall \theta \in \Theta\}$. In particular, if $P_\theta$ is a permutation and $R_\theta$ is a linear transformation, it may be observed constraints $W = P_\theta^{-1} W R_\theta$ are linear, and consequently, $\mathcal{W}$ is a linear subspace of the total space of weight matrices. Accordingly, in some embodiments, set BWM may be defined as a basis of the space $\mathcal{W}$. In such cases, for example, set BWM may be determined by hand or computed from transformations $R_\theta$ and permutations $P_\theta$, e.g., using known linear algebra techniques.

Set $\mathcal{W}$ above may also be defined for single input and/or output channels, in which case base weight matrices BWi may be obtained from matrices $W \in \mathcal{W}$ by applying the matrix to respect input channels and/or to obtain respective output channels.

Interestingly, it is not needed for set of base weight matrices BWM to span the full set of equivariant weight matrices. For example, BWM may be sampled as a randomly sampled subspace of the space of equivariant weight matrices. This way, a reduction in the number of parameters C1, . . . , Ck may be achieved while still preserving equivariance, which can be especially important if the space of equivariant weight matrices is relatively large.

In particular, one way of automatically determining base weight matrices BWM is as follows. First, one or more initial weight matrices $W_i$ are obtained, e.g., its coefficients are randomly sampled, e.g., from a univariate Gaussian distribution or similar. A base weight matrix $\overline{W}_i$ may then be determined from initial weight matrix $W_i$ by applying transformations $T_\theta$ and permutations $P_\theta$ to the initial weight matrix, and adding the results together, e.g., to obtain $\overline{W}_i = \Sigma_{\theta \in \Theta} P_\theta^{-1} W_i R_\theta$. Thereby, effectively, initial weight matrix $W_i$ may be symmetrized to obtain a base weight matrix. The resulting weight matrix $\overline{W}_i$ may indeed be equivariant, e.g., since:

$$P_{\theta'}^{-1} \overline{W}_i R_{\theta'} =$$

$$P_{\theta'}^{-1} \left( \sum_{\theta \in \Theta} P_\theta^{-1} W_i R_\theta \right) R_{\theta'} = \left( \sum_{\theta \in \Theta} P_{\theta'}^{-1} P_\theta^{-1} W_i R_\theta R_{\theta'} \right) = \left( \sum_{\theta \circ \theta' \in \Theta} P_{\theta \circ \theta'}^{-1} W_i R_{\theta \circ \theta'} \right) = \overline{W}_i.$$

The base weight matrices obtained in this way may be further refined by orthogonalizing or even orthonormalizing the set of obtained base weight matrices. Thus, the weight matrices maybe made more independent from each other, thus facilitating training. For example, the orthogonalizing/orthonormalizing may be performed by vectorizing the determined $\{\overline{W}_i\}_{i=1}^N$ to form a matrix $\hat{W}$ with rows corresponding to $\overline{W}_i$ and computing a singular value decomposition $(SVD)\hat{W} = U\Sigma V^T$. The set of base weight matrices BWM may in this case be obtained by de-vectorizing columns of V corresponding to non-zero singular values in $\Sigma$. It may be noted that this procedure may either be used to find a complete basis, if sufficiently many initial weight matrices are taken, or a random subspace. For example, the number of initial weight matrices may be at most or at least 100, or at most or at least 250.

Accordingly, it has been discussed how, by computing a linear combination of base weight matrices BWM, linear combination outputs LCO of the final layer of the neural network may be determined corresponding to one or more possible actions to be performed.

It is also possible to applying a further linear combination of the same set of base weight matrices BWM to the final layer input FLI to obtain further linear combination outputs. The coefficients of this further linear combination may be included in the set of parameters PAR in addition to the original linear combination coefficients Ci. This is particularly appealing if the actions corresponding to the further linear combination outputs should permute in the same way when applying an environment symmetry as the original linear combination outputs LCO. By applying the same base weight matrices twice, it may be avoided to use larger base weight matrices that compute both sets of linear combination outputs at the same time, which may require using more and/or larger base weight matrices.

Moreover, it is instead or in addition possible to apply a yet further linear combination of a further set of base weight matrices to the final layer input FLI. For a further set of multiple predefined transformations of the final layer input, each transformation may cause a corresponding further predefined action permutation of a further base weight matrix output for the final layer input. In other words, the actions for which probabilities are determined using this further linear combination, may permute differently according to an environment symmetry than the actions for the original final layer outputs. The further set of translations of the final layer input may be equal to the original set of transformations of the final layer inputs, e.g., the actions corresponding to the yet further linear combination may be equivariant to the same symmetries but according to a different permutation. The further set of translations of the final layer may also be different, e.g., the actions corresponding to the yet further linear combination may be equivariant to a different set of environment symmetries. In this latter case, the final layer input FLI is possibly equivariant under both sets of symmetries.

Proceeding now to the computation of the final layer input FLI based on the observable state OS and the definition of the transformations of the final layer input, various embodiments may be envisaged.

Generally, the final layer input FLI may be obtained by applying one or more layers of a group-equivariant convolutional network to the observable state OS. Filters of the group-equivariant convolutional network may be defined as elements of a linear vector space spanned by a basis $\{e^i(\theta)\}_{i=1}^M$, where each transformation $\theta \in \Theta$ has its own basis. A set of filters may be defined by coefficients $\hat{\omega}_i$ for every filter in the basis and every input and output channel. Accordingly, the space W as described herein may be regarded as a linear vector space with basis $\{e_i\}$. Any $W \in W$ may be described as a linear combination of basis vectors. The filters $\omega$ may live in the span of this basis, in other words, they may be a representation of W in the basis $\{e_i\}$. Accordingly, W and $\omega$ may be seen to correspond. Coefficients $\hat{w}_i$ may be learned and shared between group transformations. Thus, a filter may be defined with respect to basis $\{e^i(\theta)\}_{i=1}^M$ of a group transformation $\theta$ as $$\omega(\theta) = \sum_{i=1}^M \hat{\omega}_i e^i(\theta)$$

Accordingly, the filter coefficients may be effectively shared between bases $e(\theta)$ of transformations $\theta \in \Theta$, and thus a transformed versions of $\omega(\cdot)$ may be obtained rather than a completely new filter for each $\theta \in \Theta$. The neural network may be applied by using these filters as convolutional network filters, e.g., by applying transformed filter corresponding to each transformation $\theta \in \Theta$.

Concretely, in some embodiments, the final layer input FLI may include multiple feature vectors FV1, 451 up to . . . FVm, 452, each corresponding to a respective transformation of the observable state. For example, the transformations of the final layer input may permute the multiple feature vectors according to the group structure of the environment symmetries, e.g., if $\theta_3 = \theta_1 \circ \theta_2$, then transformation $T_{\theta_1}$ of the final layer inputs may map the feature vector corresponding to symmetry $\theta_2$ to the feature vector corresponding to symmetry $\theta_3$, etcetera. This structure of having a feature vector for each environment symmetry may be replicated at some or all previous layers of the neural network NN, and thereby, equivariance may be preserved throughout the neural network.

Regardless of how the transformations of intermediate layer inputs and outputs are defined exactly, however, it is also possible at some or all other layers of the neural network to use linear combinations of base weight matrices to compute the layer outputs. For example, further base weight matrix data may be obtained representing a set of further base weight matrices for a further layer of the neural network wherein transforming a further layer input according to a transformation from the set of multiple predefined transformations causes a corresponding predefined transformation of a further base weight matrix output for the further layer input. To evaluate the further layer, a linear combination of the set of further base weight matrices may be applied to the further layer input, again parametrized by the set of parameters PAR. Also in this case, it is possible to determine the set of further base weight matrices given the transformations $R_\theta$ of the layer inputs and $P_\theta$ of the layer outputs corresponding to the environment symmetries, for example, by finding a basis of $\{W|W=P_\theta^{-1}\ ^{WR}\theta, \forall \theta \in \Theta\}$ or a subspace as descibed above.

In some embodiments, one or more earlier layers of the neural network NN may be designed to be equivariant not just to the state-action symmetries $\Theta$, but also to translations. For example, the observable state may include an image of the physical environment, wherein one or more initial layers of the neural network are equivariant to translations of the image in addition to the state-action symmetries. For example, the group-equivariant neural network layers of "Group Equivariant Convolutional Networks" may be used. It is noted that translations of the observable state generally do not induce a state-action symmetry since, in many applications, they do not result in a permutation of desirable actions. Still, by including translations in earlier layers of the neural network, they may be used in those earlier layers for object recognition tasks as is common, e.g., in convolutional neural networks. At later layers, the translation symmetries may then be effectively factored out by average pooling over the translations of the observable state.

Neural network NN may be used to interact with a physical environment, by repeatedly obtaining sensor data indicative of observable state OS of the physical environment;

determining action probabilities APi based on the observable state OS; and providing, to an actuator, actuator data causing the actuator to effect an action in the physical environment based on the determined action probabilities APi. For example, the effected action may be sampled according to the action probabilities, or the action with the maximum probability may be selected, etcetera/

Neural network NN may be trained by repeatedly obtaining interaction data indicative of a sequence of observed environment states and corresponding actions performed by the system; determining a reward of the interaction; determining an action probability APi, in an observed state of the sequence of observed environment states, of the policy selecting the corresponding action, and adjusting the set of parameters to increase the expected reward based on the determined reward and action probability. Various reinforcement learning techniques that are known per se may be applied; for example, a policy gradient algorithm such as the one disclosed in "Proximal Policy Optimization Algorithms" may be used. As is known, such optimization methods may be heuristic and/or arrive at a local optimum. It is possible both to use on-policy methods, in which the interaction data is obtained from an interaction according to the current set of parameters of the policy, and off-policy methods, in which this is not the case. In any case, whereas optimizing a standard neural network policy would traditionally involve update all or most filter weights, interestingly, using the techniques presented herein the coefficients $C_i$ of base weight matrices may be updated instead, resulting in quicker and more efficient learning.

Figure 5A:
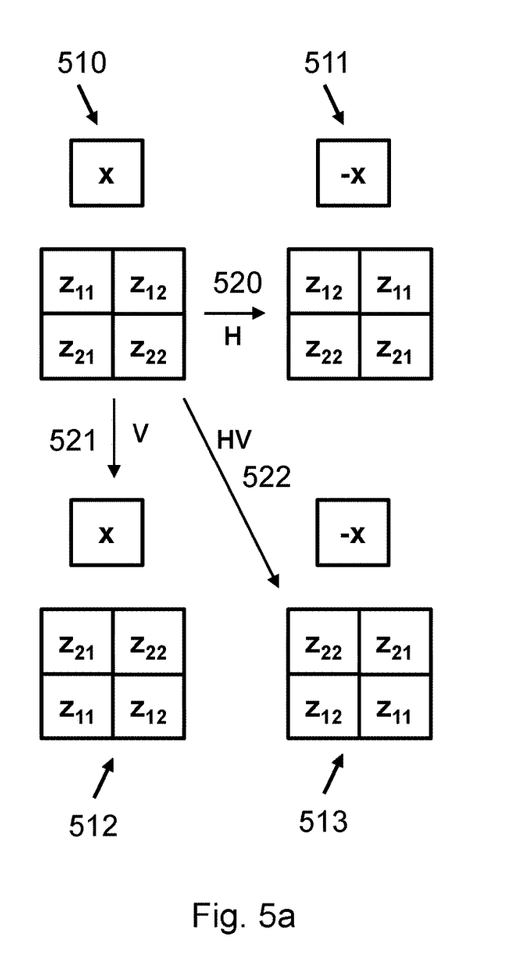
FIG. 5a shows an example of transformations of observable states.
Figure 5B:
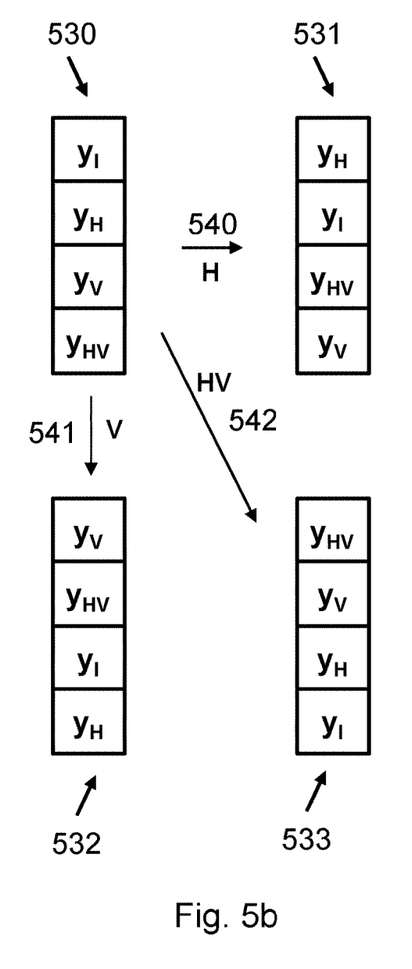
FIG. 5b shows an example of transformations of final layer inputs.
Figure 5C:
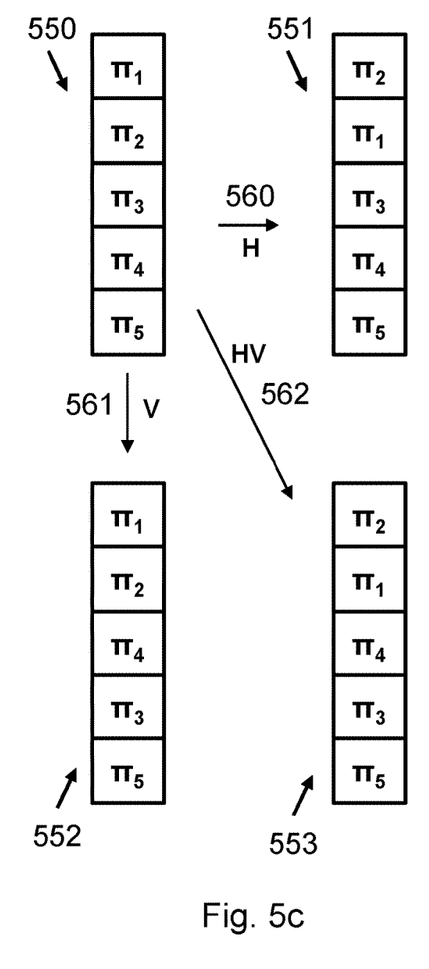
FIG. 5c shows an example of action permutations of actions to be performed.

FIGS. 5a-5c show a non-limiting example of transformations of observable states and final layer inputs, and action permutations of a set of action probabilities. Shown is an observable state 510, e.g., observable state OS of FIG. 4, including a 2-by-2 input image with features $z_{11}$, $z_{12}$, $z_{21}$, $z_{22}$ and an additional sensor measurement x. Shown also is a vector 550 of action probabilities $\pi_1$, $\pi_2$, $\pi_3$, $\pi_4$, $\pi_5$, e.g., action probabilities AP1, . . . APn of FIG. 4.

As an example, the physical environment in which observable state 510 is obtained and actions 550 are performed may be expected to be equivariant to horizontal and vertical mirroring. In this example, the set of transformations $\Theta=\{I, H, V, H \circ V\}$ including identity I, horizontal mirrorring H, vertical mirroring V, and horizontal plus vertical mirroring $H \circ V$ may be regarded as a group in the mathematical sense, with operation $\circ$ with I being the identity, $H \circ H=I$, $H \circ (H \circ V)=V$, etcetera.

For example, horizontal mirroring of the observable state, denoted by arrow 520, may lead to transformed state 511. In this transformed state, the image is mirrored horizontally while the additional sensor measurement is negated, e.g., x may represent an angle in the vertical plane. Similarly, vertical mirroring of the observable state is denoted by arrow 521, leading e.g. to transformed state 521 in which the image is vertically mirrored but the sensor measurement remains the same. Observable state 510 may also be mirrored both horizontally and vertically, leading e.g. to transformed state 513.

In this example, transformations $\Theta$ of the observable state may be expected to lead to action permutations of the set of action permutations of the neural network. For example, based on domain knowledge, it may be expected that the set of action probabilities $(\pi_1, \pi_2, \pi_3, \pi_4, \pi_5)$, 550 should permute under the horizontal mirror symmetry 560 to action probabilities $(\pi_2, \pi_1, \pi_3, \pi_4, \pi_5)$, 551; in other words, the first action is expected to be equally desirable in the original observable state as the second action in the transformed observable state, and the other way around. The other three actions in this example are not affected by the horizontal symmetry. Similarly, under the vertical symmetry 561 the action probabilities should permute to $(\pi_1, \pi_2, \pi_3, \pi_4, \pi_5)$, 552; and under the horizontal and vertical symmetry 553 the action probabilities should permute to $(\pi_2, \pi_1, \pi_4, \pi_3, \pi_5)$, 553.

Using the techniques presented herein, such an equivariance between transformations of observable state 510 and corresponding permutations of action probabilities 550 output by a neural network, may be achieved by computing a final layer input 530 from observable state 510 in an equivariant way, and then computing the action probabilities 550 from final layer input 530 in an equivariant way. To this end, final layer input 530 may include multiple feature vectors corresponding to respective transformations $\Theta$. Shown in the figure are feature vectors $y_I$, $y_H$, $y_V$, and $y_{HV}$ corrsponding to transformations I, H, V, and HV, respectively. The transformations $\Theta$ in this example permute final layer input 530 according to the group action of $\Theta$. For example, transforming final layer input 530 by a horizontal symmetry 540 permutes $(y_I, y_H, y_V, y_{HV})$ to $(y_H, y_I, y_{HV}, y_V)$ 531, since applying H to I, H, V, $H \circ V$ gives H, I, $H \circ V$, V, respectively. Similarly, transforming final layer input 530 by vertical symmetry 541 gives ($y_V$, $y_{HV}$, $y_I$, $y_H$), 532, and transforming final layer input 542 by horizontal and vertical symmetry 542 gives ($y_{HV}$, $y_V$, $y_H$, $y_I$), 533.

Accordingly, as demonstrated in this example, given transformations of the observable state 510 and action permutations 550, both of which may be manually defined based on domain knowledge of the physical system at hand, a transformation of final layer input 530 can be automatically determined. Given the transformations of the final layer input and the action permutations, as disclosed herein, a set of base weight matrices may be automatically determined wherein the final layer of the neural network preserves equivariance. By also computing final layer input 530 in an equivariant way, e.g., using similarly-shaped additional layers, the symmetries of the physical environment may be effectively incorporated in a neural network.

Figure 6:
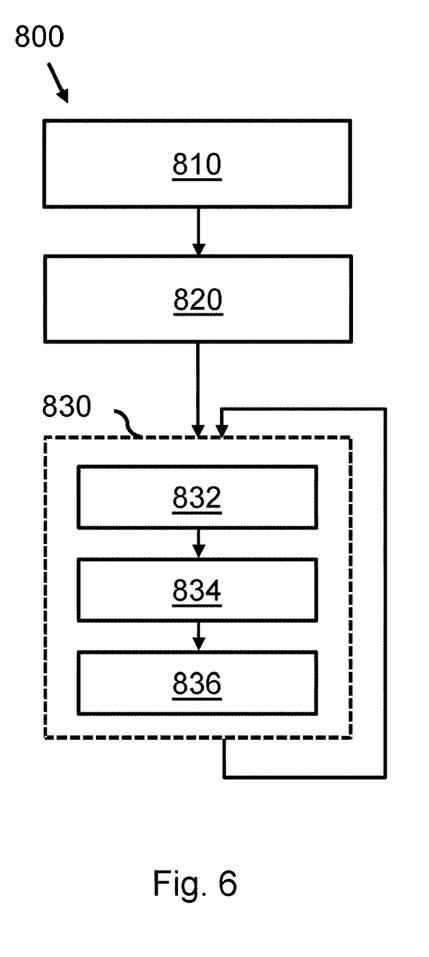
FIG. 6 shows a computer-implemented method of interacting with a physical environment according to a policy.

FIG. 6 shows a block-diagram of computer-implemented method 800 of interacting with a physical environment according to a policy. The policy may determine multiple action probabilities of respective actions based on an observable state of the physical environment. The policy may include a neural network parameterized by a set of parameters. The neural network may determine the action probabilities by determining a final layer input from an observable state and applying a final layer of the neural network to the final layer input. The method 800 may correspond to an operation of the system 100 of FIG. 1. However, this is not a limitation, in that the method 800 may also be performed using another system, apparatus or device.

The method 800 may include, in an operation titled "ACCESSING POLICY", accessing 810 the set of parameters of the policy The method 800 may include, in an operation titled "OBTAINING BASE WEIGHT MATRIX DATA", obtaining 820 base weight matrix data representing a set of base weight matrices for the final layer of the neural network wherein, for a set of multiple predefined transformations of the final layer input, each transformation causes a corresponding predefined action permutation of a base weight matrix output for the final layer input.

The method 800 may include, in an operation titled "CONTROLLING INTERACTION", controlling 830 the interaction with the physical environment. To control the interaction, operation 830 may include repeatedly:
   in an operation titled "OBTAINING SENSOR DATA", obtaining 832, from one or more sensors, sensor data indicative of the observable state of the physical environment;
   in an operation titled "DETERMINING ACTION PROBABILITIES", determining 834 the action probabilities based on the observable state, including applying the final layer of the neural network by applying a linear combination of the set of base weight matrices to the final layer input, coefficients of the linear combination being included in the set of parameters;
   in an operation titled "PROVIDING ACTUATOR DATA", providing 836, to an actuator, actuator data causing the actuator to effect an action in the physical environment based on the determined action probabilities.

Figure 7:
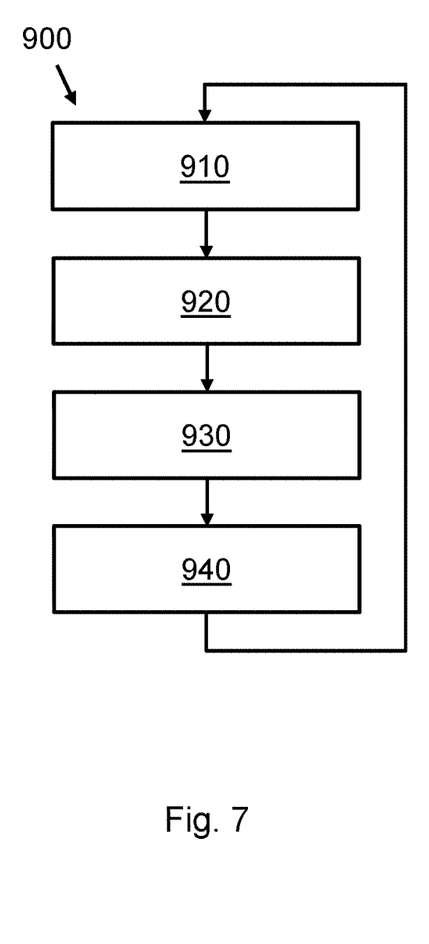
FIG. 7 shows a computer-implemented method of configuring a system which interacts with a physical environment according to a policy.

FIG. 7 shows a block-diagram of computer-implemented method 900 of configuring a system which interacts with a physical environment according to a policy. For example, the system may use method 800 of FIG. 8. Method 900 may include optimizing the set of parameters of the policy to maximize an expected reward of interacting with the environment according to the policy by repeatedly:
   in an operation titled "OBTAINING INTERACTION DATA", obtaining 910 interaction data indicative of a sequence of observed environment states and corresponding actions performed by the system;
   in an operation titled "DETERMINING REWARD", determining 920 a reward of the interaction;
   in an operation titled "DETERMINING ACTION PROBABILITY", determining 930 an action probability, in an observed state of the sequence of observed environment states, of the policy selecting the corresponding action, including applying the final layer of the neural network by applying a linear combination of the set of base weight matrices to the final layer input, coefficients of the linear combination being included in the set of parameters;
   in an operation titled "ADJUSTING PARAMETERS", adjusting 940 the set of parameters to increase the expected reward based on the determined reward and action probability.

It will be appreciated that, in general, the operations of method 800 of FIG. 6 and method 900 of FIG. 7 may be performed in any suitable order, e.g., consecutively, simultaneously, or a combination thereof, subject to, where applicable, a particular order being necessitated, e.g., by input/output relations.

Figure 8:
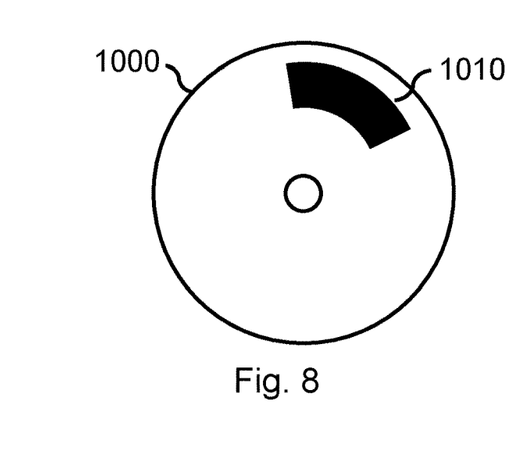
FIG. 8 shows a computer-readable medium including data.

The method(s) may be implemented on a computer as a computer implemented method, as dedicated hardware, or as a combination of both. As also illustrated in FIG. 8, instructions for the computer, e.g., executable code, may be stored on a computer readable medium 1000, e.g., in the form of a series 1010 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 11 shows an optical disc 1000.

Instead or in addition, the computer readable medium 1000 may include transitory or non-transitory data 1010 representing a set of parameters of a policy for interacting with a physical environment as described herein, the policy determining multiple action probabilities of respective actions based on an observable state of the physical environment, the policy including a neural network, the neural network determining the action probabilities by determining a final layer input from an observable state and applying a final layer of the neural network to the final layer input, the final layer of the neural network being applied by applying a linear combination of the set of base weight matrices to the final layer input, coefficients of the linear combination being included in the set of parameters.

Instead or in addition, the computer readable medium 1000 may include transitory or non-transitory data 1010 representing base weight matrix data representing a set of base weight matrices for a policy for interacting with a physical environment as described herein, the policy determining multiple action probabilities of respective actions based on an observable state of the physical environment, the policy including a neural network, the neural network determining the action probabilities by determining a final layer input from an observable state and applying a final layer of the neural network to the final layer input, the final layer of the neural network being applied by applying a linear combination of the set of base weight matrices to the final layer input.

Examples, embodiments or optional features, whether indicated as non-limiting or not, are not to be understood as limiting some embodiments of the presently disclosed subject matter as claimed.

It should be noted that the above-mentioned embodiments illustrate rather than limit some embodiments of the presently disclosed subject matter, and that those skilled in the art will be able to design many alternative embodiments without departing from the scope of the appended claims. In the claims, any reference signs placed between parentheses shall not be construed as limiting the claim. Use of the verb "include" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. Some other embodiments of the presently disclosed subject matter may be implemented by means of hardware including several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method of interacting with a physical environment according to a policy, the policy determining multiple action probabilities of respective actions based on an observable state of the physical environment, wherein the policy includes a neural network parameterized by a set of parameters, the neural network determining the action probabilities by determining a final layer input from an observable state and applying a final layer of the neural network to the final layer input, the method comprising:
   accessing the set of parameters of the policy;
   obtaining base weight matrix data representing a set of base weight matrices for the final layer of the neural network, wherein, for a set of multiple predefined transformations of the final layer input, each transformation causes a corresponding predefined action permutation of a base weight matrix output for the final layer input;
   controlling the interaction with the physical environment by repeatedly:
      obtaining, from one or more sensors, sensor data indicative of the observable state of the physical environment;
      determining the action probabilities based on the observable state, including applying the final layer of the neural network by applying a linear combination of the set of base weight matrices to the final layer input, coefficients of the linear combination being included in the set of parameters;
      providing, to an actuator, actuator data causing the actuator to effect an action in the physical environment based on the determined action probabilities.

2. The method of claim 1, wherein the sensor data includes an image of the physical environment.

3. The method of claim 2, wherein a feature transformation corresponds to a rotation and/or a feature transformation corresponds to a reflection.

4. The method of claim 2, wherein the sensor data additionally includes one or more additional sensor measurement values.

5. The method of claim 1, wherein applying the final layer further includes applying a further linear combination of the set of base weight matrices to the final layer input, coefficients of the further linear combination being included in the set of parameters.

6. The method of claim 1, wherein applying the final layer further includes applying a further linear combination of a further set of base weight matrices to the final layer input, wherein, for a further set of multiple predefined transformations of the final layer input, each transformation causes a corresponding further predefined action permutation of a further base weight matrix output for the final layer input.

7. The method of claim 1, wherein a layer input of a layer of the neural network includes multiple feature vectors corresponding to respective transformations of the observable state, a feature of said layer input being determined by average pooling over feature vectors corresponding to translations of the observable state.

8. A computer-implemented method of configuring a system which interacts with a physical environment according to a policy using the method of claim 1, including optimizing the set of parameters of the policy to maximize an expected reward of interacting with the environment according to the policy by repeatedly:
   obtaining interaction data indicative of a sequence of observed environment states and corresponding actions performed by the system;
   determining a reward of said interaction;
   determining an action probability, in an observed state of the sequence of observed environment states, of the policy selecting the corresponding action, including applying the final layer of the neural network by applying a linear combination of the set of base weight matrices to the final layer input, coefficients of the linear combination being included in the set of parameters;
   adjusting the set of parameters to increase the expected reward based on the determined reward and action probability.

9. The method of claim 8, comprising obtaining the set of base weight matrices by determining the set of base weight matrices from the multiple predefined transformations and corresponding predefined action permutations.

10. The method of claim 9, comprising determining a base weight matrix by obtaining an initial weight matrix, applying transformations and inverses of a corresponding action permutations to the initial weight matrix, and adding together said transformed and permuted initial weight matrices.

11. The method of claim 10, further comprising orthogonalizing the set of determined base weight matrices.

12. A non-transitory computer-readable medium comprising transitory or non-transitory data representing instructions which, when executed by a processor system cause the processor system to perform the computer-implemented method according to claim 8.

13. A training system for configuring a computer-controlled system which interacts with a physical environment according to a policy using the method of claim 1, the training system comprising:
   a data interface for accessing the set of parameters of the policy and base weight matrix data representing a set of base weight matrices for the final layer of the neural network wherein, for a set of multiple predefined transformations of the final layer input, each transformation causes a corresponding predefined action permutation of a base weight matrix output for the final layer input;

a processor subsystem configured to optimize the set of parameters of the policy to maximize an expected reward of interacting with the environment according to the policy by repeatedly:
obtaining interaction data indicative of a sequence of observed environment states and corresponding actions performed by the computer-controlled system;
determining a reward of said interaction;
determining an action probability, in an observed state of the sequence of observed environment states, of the policy selecting the corresponding action, including applying the final layer of the neural network by applying a linear combination of the set of base weight matrices to the final layer input, coefficients of the linear combination being included in the set of parameters;
adjusting the set of parameters to increase the expected reward based on the determined reward and action probability.

14. A non-transitory computer-readable medium comprising data representing one or more of:
instructions which, when executed by a processor system, cause the processor system to perform the computer-implemented method according to claim 1;
a set of parameters of a policy for interacting with a physical environment, the policy determining multiple action probabilities of respective actions based on an observable state of the physical environment, the policy including a neural network, the neural network determining the action probabilities by determining a final layer input from an observable state and applying a final layer of the neural network to the final layer input, the final layer of the neural network being applied by applying a linear combination of the set of base weight matrices to the final layer input, coefficients of the linear combination being included in the set of parameters;
base weight matrix data representing a set of base weight matrices for a policy for interacting with a physical environment, the policy determining multiple action probabilities of respective actions based on an observable state of the physical environment, the policy including a neural network, the neural network determining the action probabilities by determining a final layer input from an observable state and applying a final layer of the neural network to the final layer input, the final layer of the neural network being applied by applying a linear combination of the set of base weight matrices to the final layer input.

15. A computer-controlled system for interacting with a physical environment according to a policy, the policy determining multiple action probabilities of respective actions based on an observable state of the physical environment, wherein the policy includes a neural network parameterized by a set of parameters, the neural network determining the action probabilities by determining a final layer input from an observable state and applying a final layer of the neural network to the final layer input, the system comprising:
a data interface for accessing the set of parameters of the policy;
a sensor interface for obtaining, from one or more sensors, sensor data indicative of the observable state of the physical environment;
an actuator interface for providing, to an actuator, actuator data causing the actuator to effect an action in the physical environment;
a processor subsystem configured to obtain base weight matrix data representing a set of base weight matrices for the final layer of the neural network wherein, for a set of multiple predefined transformations of the final layer input, each transformation causes a corresponding predefined action permutation of a base weight matrix output for the final layer input; and to control the interaction with the physical environment by repeatedly:
obtaining, via the sensor interface, sensor data from the one or more sensors indicative of the observable state of the physical environment;
determining the action probabilities based on the observable state, including applying the final layer of the neural network by applying a linear combination of the set of base weight matrices to the final layer input, coefficients of the linear combination being included in the set of parameters;
providing, via the actuator interface, actuator data to the actuator causing the actuator to effect an action in the physical environment based on the determined action probabilities.

* * * * *